United States Patent
Zou et al.

(10) Patent No.: US 11,105,829 B2
(45) Date of Patent: Aug. 31, 2021

(54) MEMS ACCELEROMETER

(71) Applicant: Senodia Technologies (Shaoxing) Co., Ltd., Shaoxing (CN)

(72) Inventors: Bo Zou, Shanghai (CN); Qinglong Zheng, Shanghai (CN)

(73) Assignee: SENODIA TECHNOLOGIES (SHAOXING) CO., LTD., Shaoxing (CN)

( * ) Notice: Subject to any disclaimer, the term of this patent is extended or adjusted under 35 U.S.C. 154(b) by 0 days.

(21) Appl. No.: 16/967,141

(22) PCT Filed: Jan. 28, 2019

(86) PCT No.: PCT/CN2019/073334
§ 371 (c)(1),
(2) Date: Aug. 4, 2020

(87) PCT Pub. No.: WO2019/154146
PCT Pub. Date: Aug. 15, 2019

(65) Prior Publication Data
US 2020/0355722 A1    Nov. 12, 2020

(30) Foreign Application Priority Data
Feb. 6, 2018 (CN) .......................... 201810117097.2

(51) Int. Cl.
*G01P 15/18* (2013.01)
*G01P 15/125* (2006.01)

(52) U.S. Cl.
CPC ............ *G01P 15/125* (2013.01); *G01P 15/18* (2013.01)

(58) Field of Classification Search
CPC . G01P 15/125; G01P 15/18; G01P 2015/0831
See application file for complete search history.

(56) References Cited

U.S. PATENT DOCUMENTS 5,060,039 A * 10/1991 Weinberg .............. G01P 15/132
73/514.24
6,104,073 A * 8/2000 Ferrari ................ G01P 15/0802
257/254

(Continued)

FOREIGN PATENT DOCUMENTS

| CN | 101738496 A | 6/2010 |
|---|---|---|
| CN | 102435777 A | 5/2012 |

(Continued)

*Primary Examiner* — David J Bolduc
(74) *Attorney, Agent, or Firm* — Bayramoglu Law Offices LLC

(57) ABSTRACT

A MEMS accelerometer, including: a substrate, a movable component and a fixed electrode group, wherein a surface of the substrate has an anchoring region; the movable component is connected to the anchoring region through a supporting beam and suspended above the substrate, and the movable component includes a first proof mass and a second proof mass; the first proof mass has a first hollowed-out region in the middle, the first hollowed-out region is I-shaped, and the second proof mass is located in the first hollowed-out region; and the fixed electrode group includes a first electrode group, which is fixed on the surface of the substrate, located between the substrate and the movable component, and forms a Z-axis detection capacitor bank with the first proof mass and the second proof mass.

11 Claims, 5 Drawing Sheets

(56) References Cited

U.S. PATENT DOCUMENTS

| | | | |
|---|---|---|---|
| 6,109,106 A * | 8/2000 | Ferrari | B81C 1/00246 |
| | | | 257/E21.552 |
| 6,393,913 B1 | 5/2002 | Dyck et al. | |
| 6,938,483 B1 * | 9/2005 | Yan | G01C 19/5719 |
| | | | 73/504.04 |
| 7,640,803 B1 * | 1/2010 | Gutierrez | G01P 15/14 |
| | | | 73/504.04 |
| 8,689,631 B1 * | 4/2014 | Tally | G01C 19/5762 |
| | | | 73/504.12 |
| 10,234,476 B2 * | 3/2019 | Waters | G01C 19/04 |
| 10,352,960 B1 * | 7/2019 | Shcheglov | B81B 3/0072 |
| 2003/0200807 A1 * | 10/2003 | Hulsing, II | G01P 15/125 |
| | | | 73/514.01 |
| 2005/0039530 A1 * | 2/2005 | Schellin | B81C 99/006 |
| | | | 73/514.32 |
| 2007/0193355 A1 * | 8/2007 | Axelrod | G01P 15/125 |
| | | | 73/514.32 |
| 2009/0064784 A1 * | 3/2009 | Wang | G01P 15/125 |
| | | | 73/514.32 |
| 2009/0183570 A1 * | 7/2009 | Acar | G01P 15/125 |
| | | | 73/514.32 |
| 2010/0199783 A1 * | 8/2010 | Sakurai | G01P 15/18 |
| | | | 73/862.044 |
| 2013/0247666 A1 * | 9/2013 | Acar | G01P 15/125 |
| | | | 73/514.01 |
| 2015/0020591 A1 * | 1/2015 | Tanaka | B81B 3/0021 |
| | | | 73/514.32 |
| 2018/0273375 A1 * | 9/2018 | Tanaka | B81C 1/00166 |
| 2019/0277879 A1 * | 9/2019 | Ikeda | G01P 15/08 |
| 2021/0135652 A1 * | 5/2021 | Ogura | H03H 9/132 |

FOREIGN PATENT DOCUMENTS

| | | |
|---|---|---|
| CN | 104730289 A | 6/2015 |
| CN | 106915721 A | 7/2017 |
| CN | 107271722 A | 10/2017 |
| CN | 107407695 A | 11/2017 |
| CN | 108020687 A | 5/2018 |
| CN | 208314017 U | 1/2019 |
| WO | 2018004113 A1 | 1/2018 |

* cited by examiner

MEMS ACCELEROMETER

This application is the national phase entry of International Application No. PCT/CN2019/073334, filed on Jan. 28, 2019, which is based upon and claims priority to Chinese Patent Application No. 201810117097.2, filed on Feb. 6, 2018, the entire contents of which are incorporated herein by reference.

TECHNICAL FIELD

The present invention relates to the field of micro-electromechanical systems, and more specifically, to a MEMS accelerometer.

BACKGROUND

Micro-Electro-Mechanical Systems (MEMS) are micro-integrated systems that use integrated circuit manufacturing technology and micro-processing technology to manufacture microstructures, microsensors, control processing circuits and even interfaces, communications and power supplies, etc., on one or more chips. Because of their advantages of small volume, low cost, good integration, excellent performance and so on, the micro-electromechanical systems have been widely used in more and more applications such as industry, medical, civil, military and so on. As the most typical device using micro-electromechanical technology, the acceleration sensor is almost a standard configuration of various mobile terminals, cameras, gamepads, navigators and other products. MEMS accelerometers can be divided into capacitive, resistive, piezoelectric and other accelerometers according to their different detection methods. Among them, the capacitive accelerometer is the most popular accelerometers because of its advantages of simple structure, low cost, and higher sensitivity and linearity in the low frequency range.

For the current three-axis accelerometers, the proof masses sharing three axes may be usually used to realize the purpose of reducing the chip area. However, the existing three-axis accelerometer is often affected by the following two interference factors, resulting in a high zero-offset parameter of the accelerometer: one is the stress warping caused by the manufacturing process, the external environmental temperature changes or the like, that is, the substrate plane is not completely flat; and the other is the deflection of the anchor caused by the manufacturing process or the like, so that the plane of the MEMS structure is not parallel to the plane of the fixed electrode. Due to the above two factors, the accuracy of the capacitive accelerometer cannot be further improved, which limits the application of the capacitive accelerometer. Therefore, those skilled in the art endeavor to develop a capacitive accelerometer that can overcome the above two kinds of interference.

SUMMARY

In view of this, the present invention provides a MEMS three-axis accelerometer to solve the problem existing in the current accelerometer that due to stress warping caused by the manufacturing process, the external environmental temperature changes or the like, and the deflection of the anchor caused by the manufacturing process or the like, the plane of the MEMS structure is not parallel to the plane of the fixed electrode, so that zero offset is generated.

In order to achieve the above objective, the present invention provides the following technical solution.

A MEMS accelerometer, including: a substrate, a movable component and a fixed electrode group. A surface of the substrate has an anchoring region. The movable component is connected to the anchoring region through a supporting beam and suspended above the substrate. The movable component includes a first proof mass and a second proof mass, wherein the first proof mass has a first hollowed-out region in the middle, the first hollowed-out region is I-shaped, and the second proof mass is located in the first hollowed-out region. The fixed electrode group includes a first electrode group, wherein the first electrode group is fixed on the surface of the substrate, is located between the substrate and the movable component, and forms a Z-axis detection capacitor bank with the first proof mass and the second proof mass, to detect an acceleration input along a Z axis. The Z axis is a direction perpendicular to a plane where the movable component is located.

Preferably, the first electrode group includes at least 5 pairs of fixed electrode pairs E1-E5, which are sequentially disposed along a Y-axis direction, wherein the fixed electrode pairs E1, E3, E5 and the first proof mass form a first Z-axis detection capacitor bank, the fixed electrode pairs E2, E4 and the second proof mass form a second Z-axis detection capacitor bank, and the Y-axis direction is located in the plane where the movable component is located, and is perpendicular to the Z-axis direction.

Further, each of the fixed electrode pairs E1-E5 includes two fixed electrodes disposed along an X axis separately, the two fixed electrodes are located on both sides of the anchoring region, and the X axis is perpendicular to both the Y axis and the Z axis.

Optionally, the fixed electrode pairs E2 and E4 are each an integral electrode.

Preferably, the fixed electrode group further includes a second electrode group and a third electrode group, the second electrode group and the third electrode group are fixed above the substrate through anchors and located on a same layer with the movable component, and the second electrode group and the third electrode group form an X-axis detection capacitor bank and a Y-axis detection capacitor bank with the first proof mass, respectively.

Further, the first proof mass has a second hollowed-out region and a third hollowed-out region, the second electrode group is located in the second hollowed-out region, and the third electrode group is located in the third hollowed-out region.

Further, the second hollowed-out region and the third hollowed-out region each includes an even number of sub-regions located on both sides of the anchoring region along the X axis.

Further, the second electrode group and the third electrode group are comb-teeth electrodes.

Preferably, the first proof mass and the second proof mass are connected through a rotating beam group, so that the first proof mass and the second proof mass translate in the Z-axis direction when the first proof mass and the second proof mass are subjected to the acceleration input along the Z axis, and movement directions of the first proof mass and the second proof mass are opposite.

Further, the rotating beam group includes 4 rotating beams, the 4 rotating beams are connected to the first proof mass and the second proof mass through elastic beams, and the 4 rotating beams are connected to the supporting beam in the middle, so that the first proof mass and the second proof mass form a lever structure through the rotating beam group.

Preferably, the anchoring region is divided into two parts by the first hollowed-out region, and each part of the two parts has at least one anchor.

Compared with the prior art, the technical solution provided by the present invention has the following advantages.

1. The accelerometer structure of the present invention is bilaterally symmetrical, and the distributions of the Z-axis detection regions of the first proof mass and the second proof mass with respect to the anchor are equivalent, so it can not only reduce the influence of warping caused by stress, but also reduce zero offset caused by the deflection of the proof mass in the initial state.

2. The accelerometer of the present invention is a symmetrical lever design to make the first proof mass and the second proof mass translate on the Z axis, thereby increasing the torque of the proof masses and improving the efficiency of movement of the proof mass, namely, improving the sensitivity of the accelerometer; and at the same time, the form of movement of the translation along the Z axis excludes the influence of rotation of the proof mass on the X and Y-axis detection.

3. Since the torques of the first proof mass and the second proof mass increase, the restoring forces of the proof masses can also be improved, so that the proof masses and the fixed electrode or surrounding fixed structure are less likely to attract, thereby avoiding damage to the sensor.

4. The anchoring region is concentrated toward the center when it is set, and the number of anchors is reduced as much as possible, thereby reducing the sensitivity of the chip to temperature and stress changes, and the inconsistent offset of different anchors caused by temperature and stress changes.

BRIEF DESCRIPTION OF THE DRAWINGS

In order to more clearly illustrate the technical solutions in embodiments of the present invention or the prior art, the drawings needed to be used in the description of the embodiments or the prior art will be briefly described below. Obviously, the drawings in the following description are only some embodiments of the present invention, and other drawings can be obtained by those of ordinary skill in the art from these without any creative efforts.

DETAILED DESCRIPTION OF THE EMBODIMENTS

The technical solutions in the embodiments of the present invention will be clearly and completely described below with reference to the drawings in the embodiments of the present invention. Obviously, the described embodiments are only a part of the embodiments of the present invention, and not all the embodiments. All other embodiments obtained by those of ordinary skill in the art based on the embodiments of the present invention without creative efforts are within the scope of the present invention.

The MEMS accelerometer of the present invention mainly improves the acceleration detection input along the Z-axis. The first aspect is to divide a detection mass into a first proof mass and a second proof mass. The distribution distances of the Z-axis detection capacitor banks consisting of the two proof masses and fixed electrodes, respectively, are equivalent in the plane of the MEMS structure layer with respect to the anchoring region on one of X-axis and Y-axis directions, that is, the Z-axis detection capacitor banks consisting of the two proof masses and fixed electrodes, respectively, can be compensated for each other by difference when they are affected by the substrate warping or the deflection of the MEMS structure layer in the direction. The second aspect is to provide a special connecting structure so that when the detection mass is subjected to the acceleration input in a Z-axis direction, the detection mass translates along the Z axis direction. Thus, the detection mass increases the effective displacement range of the detection mass within a limited distance from the substrate, improving the sensitivity of the accelerometer. In addition, it can also increase the restoring force received by the detection mass at the same time, preventing the risk of device failure caused by adsorption.

In order to make the above objectives, features and advantages of the present invention more obvious and understandable, a structure of a three-axis accelerometer is taken below as an embodiment to describe the present invention in further detail with reference to the drawings.

Figure 1:
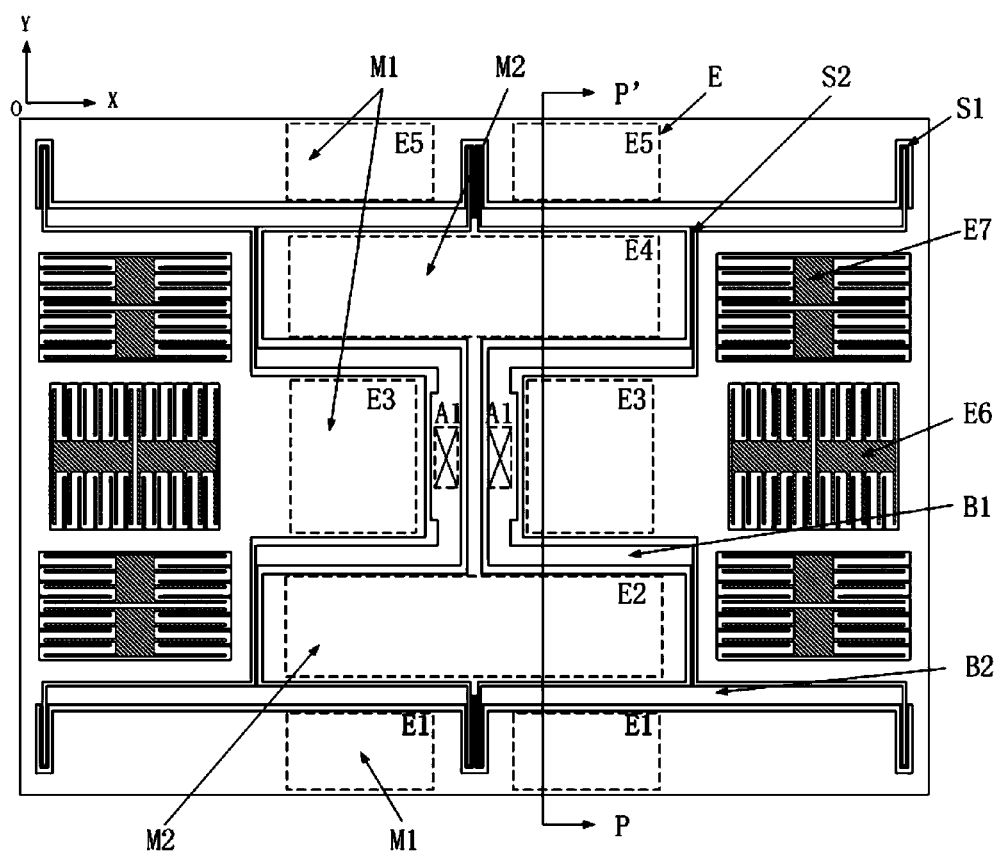
FIG. 1 is a top view of a MEMS structure layer of a MEMS accelerometer provided in a preferred embodiment of the present invention.
Figure 2:
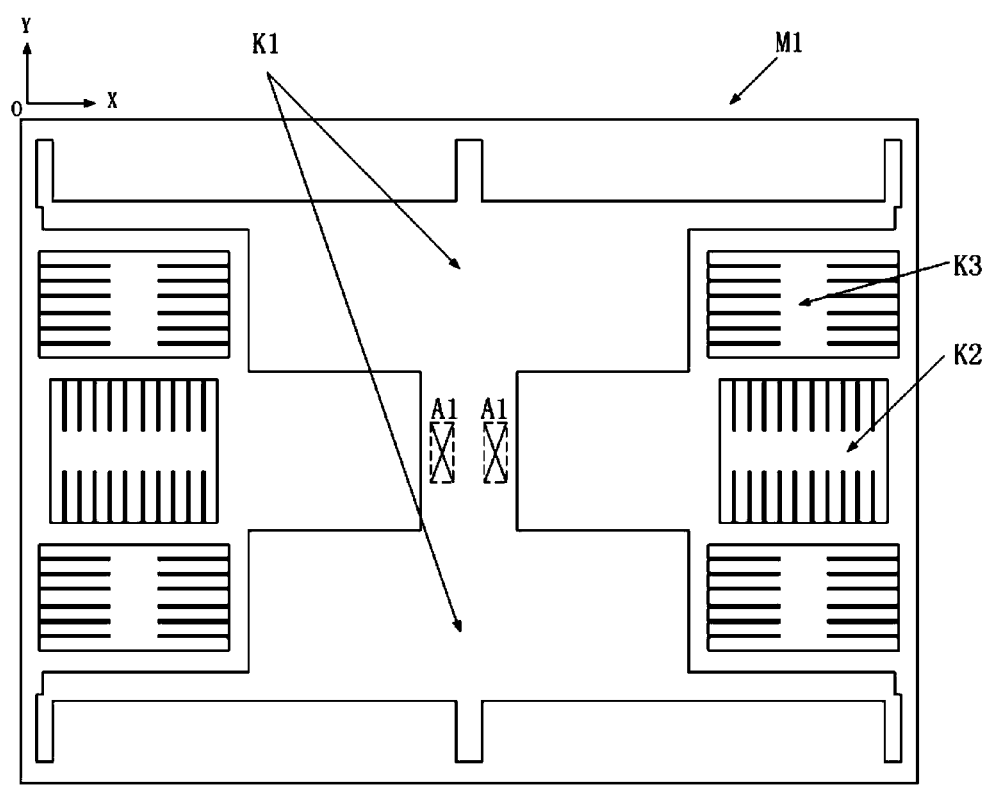
FIG. 2 is a schematic view of a first proof mass of the MEMS accelerometer shown in FIG. 1.
Figure 3:
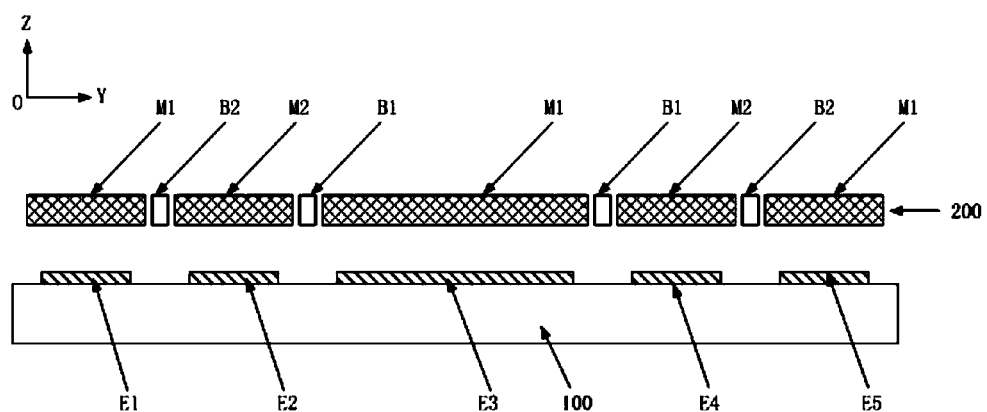
FIG. 3 is a PP' cross-sectional view of the MEMS accelerometer shown in FIG. 1.

As shown in FIGS. 1-3, a MEMS accelerometer provided in a preferred embodiment of the present invention includes the substrate 100, the movable component 200, and the fixed electrode group E. A surface of the substrate 100 has an anchoring region A1; and the movable component 200 is connected to the anchoring region A1 through the supporting beam B1 and suspended above the substrate 100. The movable component 200 includes the first proof mass M1 and the second proof mass M2; the first proof mass M1 has the first hollowed-out region K1 in the middle, the first hollowed-out region K1 is substantially I-shaped, and the second proof mass M2 is located at the first hollowed-out region K1. The fixed electrode group E includes a first electrode group, and the first electrode group is fixed on the surface of the substrate 100, is located between the substrate 100 and the movable component 200, and forms the Z-axis detection capacitor bank Cz with the first proof mass M1 and the second proof mass M2, to detect an acceleration input along a Z-axis, wherein the Z axis is a direction perpendicular to a plane where the movable component is located.

The first electrode group includes at least 5 pairs of fixed electrode pairs E1-E5 sequentially disposed along a Y-axis direction. Each of the fixed electrode pairs E1-E5 includes two fixed electrodes disposed along an X axis, located on both sides of the anchoring region. The fixed electrode pairs E1, E3, E5 and the first proof mass M1 form the first Z-axis detection capacitor bank Cz1, and the fixed electrode pairs E2, E4 and the second proof mass M2 form the second Z-axis detection capacitor bank Cz2, wherein the Y-axis direction is in a plane where the movable component is located and perpendicular to the Z-axis direction, and the X axis is perpendicular to both the Y axis and the Z axis. In the embodiment, since the second proof mass M2 above the fixed electrode pairs E2 and E4 is a complete structure, the fixed electrode pairs E2 and E4 can also be combined into integral electrodes E2 and E4, respectively.

Figure 4:
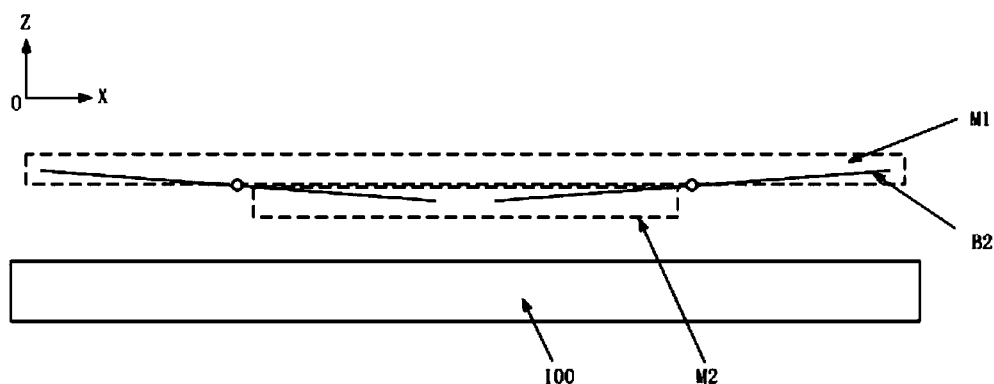
FIG. 4 is a schematic view of a Z-axis movement state of the proof mass of the MEMS accelerometer shown in FIG. 1.

The first proof mass M1 and the second proof mass M2 are connected through a rotating beam group, so that the first proof mass M1 and the second proof mass M2 translate in the Z-axis direction when they are subjected to the acceleration input along the Z-axis, and their movement directions are opposite. In the embodiment, the rotating beam group includes four rotating beams B2, which are distributed at four corners between the first proof mass M1 and the second proof mass M2. The rotating beam B2 is connected to the first proof mass M1 and the second proof mass M2 through the elastic beam S1, so that the rotating beam B2 can form a certain angle with the first proof mass M1 and the second proof mass M2. The rotating beam B2 is connected to the supporting beam B1 in the middle through the guiding beam S2, which serves as a rotating shaft of the rotating beam B2. Referring to FIG. 4, each rotating beam B2 is equivalent to one lever, so that the first proof mass and the second proof mass form a lever structure through the rotating beam group, thereby producing movement of opposite directions in the Z-axis direction. Since the four rotating beams B2 are distributed at the four corners between the first proof mass M1 and the second proof mass M2, and the first proof mass M1, the second proof mass M2 and the rotating beam group are all completely symmetrical with respect to the anchoring region A1, the first proof mass M1 and the second proof mass M2 translate in the Z-axis direction when they are subjected to the acceleration input along the Z-axis direction.

The second proof mass M2 is located in the first hollowed-out region K1 in the first proof mass M1, and the structure of the first hollowed-out region K1 is also substantially I-shaped, so that the distance distribution of the second proof mass M2 with respect to the anchoring region is equivalent to that of the first proof mass M1. However, the second proof mass M2 also divides the anchoring region A1 into two parts, each of the two parts has one anchor. The two anchors are set as close as possible to the center of the entire accelerometer structure, so that the changes in the overall structure due to the influence of the environment tend to be consistent.

The fixed electrode group further includes the second electrode group E6 and the third electrode group E7, which are fixed above the substrate 100 by the anchors, and are located on the same layer as the movable component 200. The second electrode group E6 and the third electrode group E7 form the X-axis detection capacitor bank Cx and the Y-axis detection capacitor bank Cy with the first proof mass M1, respectively. In the embodiment, the second electrode group E6 is located in the second hollowed-out region K2 of the first proof mass M1, and the third electrode group E7 is located in the third hollowed-out region K3 of the first proof mass M1 to reduce the overall area of the MEMS structure. In other embodiments, the second electrode group E6 and the third electrode group E7 may also be disposed in the hollowed-out region inside the second proof mass M2, or disposed outside the structure of the first proof mass M1.

The second electrode group E6 and the third electrode group E7 are preferably comb-tooth electrodes, which are symmetrically distributed with respect to the anchoring region. Their specific structures and distribution settings are described in previous publications, such as CN107271722A, and will not be elaborated herein.

The structure of the MEMS three-axis accelerometer provided in the preferred embodiment of the present invention has been introduced above, and the process of detecting the input acceleration will be specifically described below in conjunction with the structure of the accelerometer. Since the acceleration in any direction can be decomposed into three components in the XYZ directions, it will be specifically described below from the three directions of XYZ.

Figure 5:
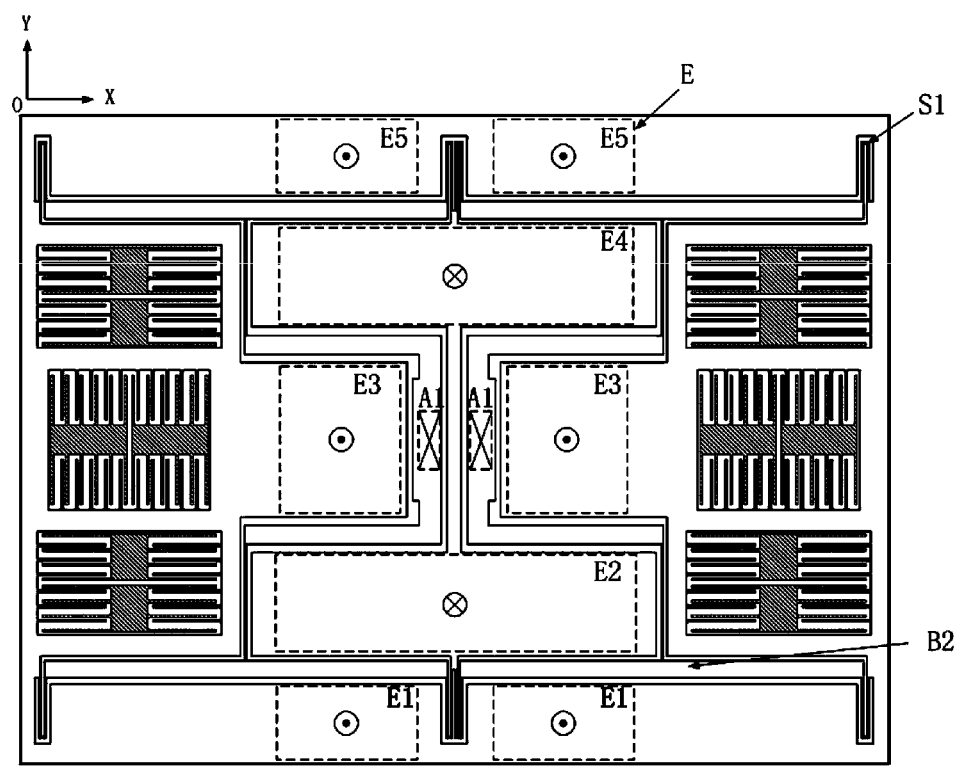
FIG. 5 is a schematic view of the principle of the MEMS accelerometer shown in FIG. 1 detecting an acceleration input along a Z axis.

When the accelerometer is subjected to an acceleration along a positive direction of the Z axis (which is perpendicular to the paper surface outwardly), as shown in FIG. 5, since the guiding beam S2 has a greater stiffness in the Z-axis direction, the detection mass will translate in the Z-axis direction under the lever function of the rotating beam B2. At this time, the overall mass of the first proof mass M1 is higher than that of the second proof mass M2, so the first proof mass M1 moves outward relative to the paper surface and the second proof mass M2 moves inward relative to the paper surface, so that the distance between electrode plates of the first Z-axis detection capacitor bank Cz1 increases, and the distance between electrode plates of the second Z-axis detection capacitor bank Cz2 decreases. Preferably, in the embodiment, the rotating beam B2 is symmetrical with respect to its axis of rotation. Therefore, the first Z-axis detection capacitor bank Cz1 and the second Z-axis detection capacitor bank Cz2 have changes in the same amplitude but in opposite directions. Then, the detection circuit detects a difference between a change amount ($\Delta Cz1$) of the first Z-Axis detection capacitor bank Cz1 and a change amount ($\Delta Cz2$) of the second Z-axis detection capacitor bank Cz2, and calculates the acceleration input along the Z axis. That is, the detection circuit measures the magnitude of the differential signal $\Delta Cz1-\Delta Cz2$, and inversely derives the magnitude of the acceleration input along the Z axis.

When the accelerometer is subjected to an acceleration along the X axis, since the first proof mass M1 and the second proof mass M2 are indirectly connected to the supporting beam B1 through the rotating beam B2, and the guiding beam S2 between the supporting beam B1 and the rotating beam B2 may be slightly displaced in the X-axis direction, the first proof mass M1 and the second proof mass M2 are each used as an effective detection mass, improving the sensitivity of X-axis detection. The specific detection process is similar to that in CN107271722A, and will not be elaborated herein.

When the accelerometer is subjected to an acceleration along the Y axis, due to the deformation of the elastic beam S1 and the guiding beam S2, the first proof mass M1 and the second proof mass M2 will be slightly displaced in the Y axis direction, but their movement directions are opposite. The magnitude of the acceleration is detected by the Y-axis detection capacitor bank Cy formed by the third electrode group E7 and the first proof mass M1.

Figure 6:
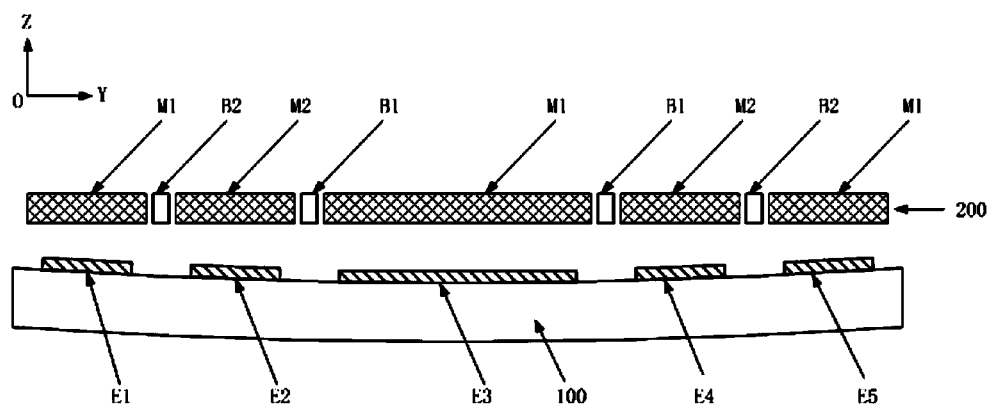
FIG. 6 is a schematic view of substrate warping of the MEMS accelerometer shown in FIG. 1.

As mentioned previously, the accelerometer of the present invention has a better performance when dealing with the situation where the substrate is warped under the influence of the environment or the MEMS structure layer is deflected. It can be seen with reference to FIG. 1 that the fixed electrode pairs E1-E5 are sequentially disposed along the Y-axis direction, so that the capacitances of the first Z-axis detection capacitor bank Cz1 and the second Z-axis detection capacitor bank Cz2 are distributed at an interval with respect to the anchoring region A1. Moreover, the first Z-axis detection capacitor bank Cz1 and the second Z-axis detection capacitor bank Cz2 are completely symmetrical with respect to the anchoring region as a whole. When the substrate 100 is warped in the Y-axis direction, as shown in FIG. 6, the distances between the first proof mass M1 and the second proof mass M2 and the substrate 100 in the initial state gradually decrease from the anchoring region toward the edge of the device structure. At this time, the amount of change in capacitance between the fixed electrode pair E3 and the first proof mass M1 is the smallest, the amounts of change in capacitance between the fixed electrode pairs E2, E4 and the second proof mass M2 are the second, and the amounts of change in capacitance between the fixed electrode pairs E1, E5 and the first proof mass M1 are the largest. Since the fixed electrode pairs E1, E3, E5 and the first proof mass M1 form the first Z-axis detection capacitor bank Cz1, and the fixed electrode pairs E2, E4 and the second proof mass M2 form the second Z-axis detection capacitor bank Cz2, the overall changes of the first Z-axis detection capacitor bank Cz1 and the second Z-axis detection capacitor bank Cz2 due to the influence of warping are generally equivalent. Then, when the acceleration of the Z axis is detected, the differential signal ΔCz1-ΔCz2 will be greatly reduced due to the influence of warping, thereby improving the reliability of the device.

Figure 7:
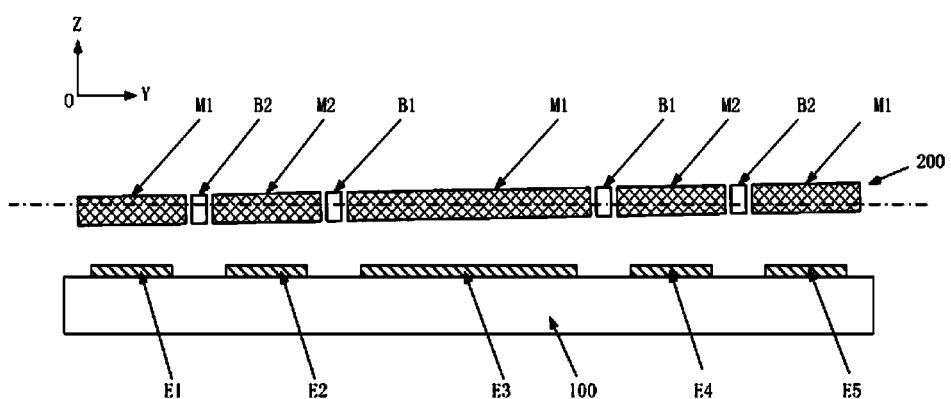
FIG. 7 is a schematic view of tilting of a MEMS structure layer of the MEMS accelerometer shown in FIG. 1.

When the movable component 200 is deflected in the Y-axis direction, as shown in FIG. 7, the distances between the first proof mass M1 and the second proof mass M2 and the substrate in the initial state gradually increase from a side of the edge of the device structure to the other side. At this time, the amounts of change in capacitance between the fixed electrode pairs E1-E3 and the proof mass are sequentially reduced, and the amounts of change in capacitance between the fixed electrode pairs E3-E5 and the proof mass are sequentially increased. Since the fixed electrode pairs E1, E3, E5 and the first proof mass M1 form the first Z-axis detection capacitor bank Cz1, and the fixed electrode pairs E2, E4 and the second proof mass M2 form the second Z-axis detection capacitor bank Cz2, the capacitances of the first Z-axis detection capacitor bank Cz1 and the second Z-axis detection capacitor bank Cz2 are substantially unchanged. Then, when the acceleration of the Z axis is detected, the differential signal ΔCz1-ΔCz2 will be not affected by warping, thereby improving the reliability of the device.

When the substrate 100 is warped along the X-axis direction, since the fixed electrode pairs E1-E5 are symmetrically distributed along the X-axis direction with respect to the anchoring region, the amounts of change in capacitance between them and the proof mass are consistent. Then, the influence caused by the warping may be eliminated by difference.

When the movable component 200 is deflected along the X-axis direction, since the fixed electrode pairs E1-E5 are symmetrically distributed along the X-axis direction with respect to the anchoring region, the capacitances of the first Z-axis detection capacitor bank Cz1 and the second Z-axis detection capacitor bank Cz2 consisting of them and the proof mass are substantially unchanged. Then, it will not be affected by the deflection during the difference calculation.

In summary, since the accelerometer structure of the present invention is a symmetric structure along the X axis and the Y axis, and the distribution distances of the Z-axis detection regions corresponding to the first proof mass M1 and the second proof mass M2 with respect to the anchoring region are equivalent. Therefore, it can not only reduce the zero offset caused by the deflection of the movable structure layer in the initial state, but also reduce the influence of warping of the substrate caused by the environment. In addition, the accelerometer of the present invention is a symmetrical lever design so that the first proof mass and the second proof mass translate on the Z axis, thereby increasing the torque and displacement distance of the proof mass and improving the efficiency of movement of the proof mass, namely, improving the sensitivity of the accelerometer; and at the same time, the form of movement of the translation along the Z axis excludes the influence of rotation of the proof mass on the X and Y axis detection. Further, since the torques of the first proof mass M1 and the second proof mass M2 increase, the restoring forces of the proof masses can also be improved, so that the proof masses and the fixed electrode or surrounding fixed structure are less likely to attract, thereby avoiding damage to the sensor. Finally, since the anchoring region is concentrated toward the center when it is set, and the number of anchors is reduced as much as possible, the sensitivity of the chip to temperature and stress changes, and the inconsistent offset of different anchors caused by temperature and stress changes can be reduced.

The above description of the disclosed embodiments enables those skilled in the art to implement or use the present invention. Various modifications to these embodiments will be obvious to those skilled in the art, and the general principles defined herein can be implemented in other embodiments without departing from the spirit or scope of the present invention. Therefore, the present invention will not be limited to the embodiments shown herein, but should conform to the widest scope consistent with the principles and novel features disclosed herein.

What is claimed is:

1. A MEMS accelerometer, comprising: a substrate, a movable component and a fixed electrode group;
    wherein a surface of the substrate has an anchoring region;
    the movable component is connected to the anchoring region through a supporting beam and suspended above the substrate, and the movable component comprises a first proof mass and a second proof mass;
    the first proof mass has a first hollowed-out region in the middle, the first hollowed-out region is I-shaped, and the second proof mass is located in the first hollowed-out region; and
    the fixed electrode group comprises a first electrode group, the first electrode group is fixed on the surface of the substrate, and located between the substrate and the movable component, a Z-axis detection capacitor bank is formed by the first electrode group, the first proof mass and the second proof mass, and is configured to detect an acceleration input along a Z axis, the Z axis is perpendicular to a plane, and the movable component is located on the plane.

2. The MEMS accelerometer according to claim 1, wherein the first electrode group comprises a first fixed electrode pair, a second fixed electrode pair, a third fixed electrode pair, a fourth fixed electrode pair and a fifth fixed electrode pair sequentially disposed along a Y-axis, wherein the first fixed electrode pairs, the third fixed electrode pair and the fifth fixed electrode pair, and the first proof mass form a first Z-axis detection capacitor bank, the second fixed electrode pairs and the fourth fixed electrode pair and the second proof mass form a second Z-axis detection capacitor bank, and the Y-axis is located in the plane where the movable component is located, and is perpendicular to the Z-axis.

3. The MEMS accelerometer according to claim 2, wherein each of the first fixed electrode pair, the second fixed electrode pair, the third fixed electrode pair, the fourth fixed electrode pair and the fifth fixed electrode pair comprises two fixed electrodes disposed along an X axis separately, the two fixed electrodes are located on both sides of the anchoring region, the X axis is perpendicular to both the Y axis and the Z axis.

4. The MEMS accelerometer according to claim 2, wherein the second fixed electrode pairs and the fourth fixed electrode pair are each an integral electrode.

5. The MEMS accelerometer according to claim 2, wherein the fixed electrode group further comprises a second electrode group and a third electrode group, the second electrode group and the third electrode group are fixed above the substrate through anchors and located on a same layer with the movable component, the second electrode group and the third electrode group form an X-axis detection capacitor bank and a Y-axis detection capacitor bank with the first proof mass, respectively.

6. The MEMS accelerometer according to claim 5, wherein the first proof mass has a second hollowed-out region and a third hollowed-out region, the second electrode group is located in the second hollowed-out region, and the third electrode group is located in the third hollowed-out region.

7. The MEMS accelerometer according to claim 6, wherein the second hollowed-out region and the third hollowed-out region each comprises an even number of sub-regions located on both sides of the anchoring region along the X axis.

8. The MEMS accelerometer according to claim 5, wherein the second electrode group and the third electrode group are comb-teeth electrodes.

9. The MEMS accelerometer according to claim 1, wherein the first proof mass and the second proof mass are connected through a rotating beam group to enable the first proof mass and the second proof mass to translate in the Z-axis when the first proof mass and the second proof mass are subjected to the acceleration input along the Z axis, and movement directions of the first proof mass and the second proof mass are opposite.

10. The MEMS accelerometer according to claim 9, wherein the rotating beam group comprises 4 rotating beams, the 4 rotating beams are connected to the first proof mass and the second proof mass through elastic beams, and the 4 rotating beams are connected to the supporting beam in the middle to enable the first proof mass and the second proof mass to form a lever structure through the rotating beam group.

11. The MEMS accelerometer according to claim 1, wherein the anchoring region is divided into two parts by the first hollowed-out region, and each part of the two parts has at least one anchor.

* * * * *